United States Patent [19]

Isono

[11] 4,303,320
[45] * Dec. 1, 1981

[54] AUTOMATIC FOCUS ADJUSTING DEVICE

[75] Inventor: Tadao Isono, Kokubunji, Japan

[73] Assignee: Osawa Precision Industries, Ltd., Japan

[*] Notice: The portion of the term of this patent subsequent to Oct. 31, 1995, has been disclaimed.

[21] Appl. No.: 57,069

[22] Filed: Jul. 12, 1979

Related U.S. Application Data

[63] Continuation-in-part of Ser. No. 860,031, Dec. 12, 1977, abandoned.

[30] Foreign Application Priority Data

Dec. 10, 1976 [JP] Japan ................... 51-147757

[51] Int. Cl.³ .................. G03B 13/18; G03B 3/10; G01J 1/44
[52] U.S. Cl. ........................... 354/25; 352/140; 250/201
[58] Field of Search .............. 354/25, 25 A; 250/201, 250/204; 352/140

[56] References Cited

U.S. PATENT DOCUMENTS

| | | | |
|---|---|---|---|
| 4,021,821 | 5/1977 | Peterson | 354/25 |
| 4,059,756 | 11/1977 | Wilwerding | 354/25 |
| 4,059,757 | 11/1977 | Wilwerding | 354/25 |
| 4,085,320 | 4/1978 | Wilwerding | 354/25 |
| 4,091,275 | 5/1978 | Wilwerding | 354/25 |
| 4,093,365 | 6/1978 | Isono | 354/25 |
| 4,123,765 | 10/1978 | Isono | 354/25 |

FOREIGN PATENT DOCUMENTS 1196771 1/1970 United Kingdom .
1354030 5/1974 United Kingdom .

*Primary Examiner*—L. T. Hix
*Assistant Examiner*—William B. Perkey
*Attorney, Agent, or Firm*—Robert E. Wagner; Ralph R. Rath

[57] ABSTRACT

An improved automatic focusing system for an optical instrument includes a scanner driven oscillatably across an angle to detect a subject positioned between infinity and the minimum focus condition of the objective lens of the optical instrument. The scanner is adjusted in response to the focus condition of the lens to align the bisector of the angle scanned with the subject when the lens is in perfect focus by electronic and mechanical interconnecting feedback means between the objective lens focusing ring and the scanning system.

1 Claim, 4 Drawing Figures

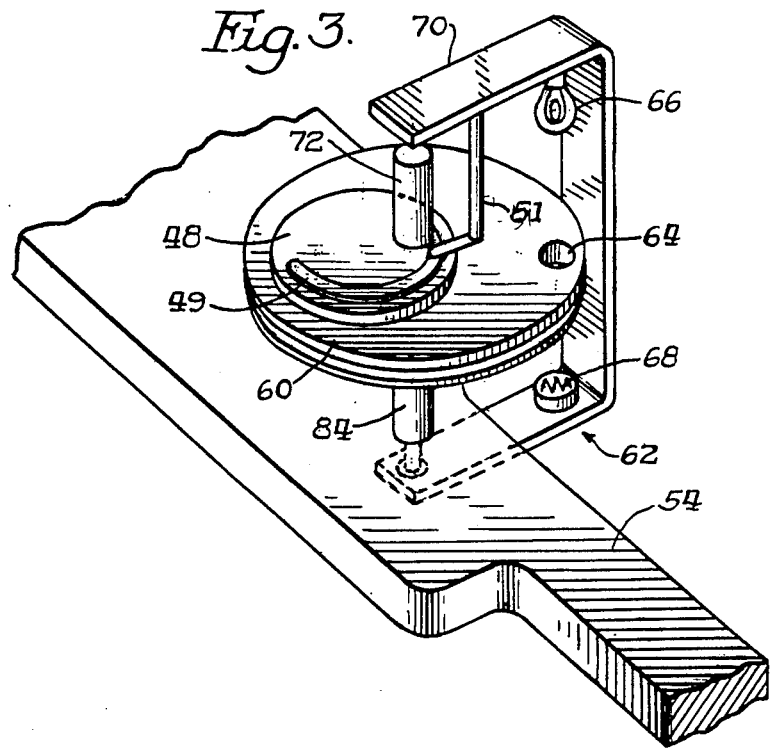
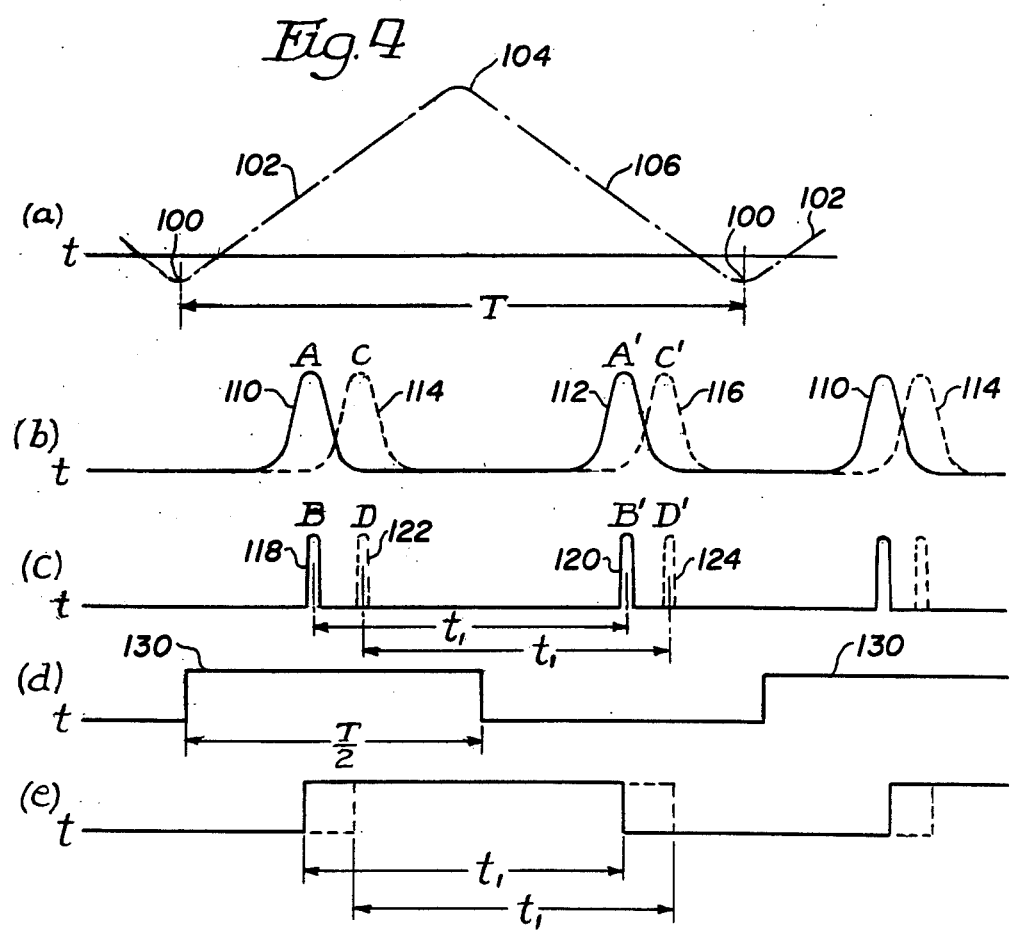

AUTOMATIC FOCUS ADJUSTING DEVICE

BACKGROUND OF THE INVENTION

This is a continuation-in-part of Ser. No. 860,031 filed Dec. 12, 1977 now abandoned.

The present invention relates to improvements in an automatic focusing system having a scanner system for use with an optical instrument having a focusable objective.

Various automatic focusing apparatus have been developed for cameras. One currently used type of automatic focusing apparatus for a camera is the "spatial image correlation" type, examples of which are described in Isono, U.S. Pat. No. 4,093,365 and the references cited thereto. Briefly, spatial image correlation systems include two optical systems: one which is stationary and one which scans a field of view which includes the object to be photographed. Images formed by the two optical systems are distributed onto respective detector arrays of light-responsive elements. A signal is produced when the light image of the object to be photographed is similarly distributed on both detector arrays. The signal is used to control the photographic lens for automatic focusing.

Typically the light-responsive elements are united with the associated optical systems in the form of a device called a "Visitronics" module manufactured by Honeywell, Inc. The module housing has a pair of windows through which the two images are introduced, each window corresponding to a respective one of the two optical systems. Each image passes through its respective window and is distributed on the corresponding light-responsive elements. Each light-responsive element of the stationary system is paired with the similarly positioned element of the scanning system, and the signals outputted by such pairs are compared electronically. When the signals from every element of one set match the signals of their respective elements of the other set, a focusing signal is generated which is used to control a motor which alters the focus of the camera objective lens.

SUMMARY OF THE INVENTION

According to one aspect of the present invention, the focusing system includes a scanner whose field of scan may be varied. The scanner is mechanically coupled and varied by the position of the objective lens. Illustratively, the position of the objective lens is automatically adjusted, by a motor, for example, until the orientation of the center of the scanner's sweep (its bisector) is on subject. By a predetermined relationship between the objective lens and the scanning system, the objective lens is focused on subject when the bisector is on subject. The motor responds to a control circuit which compares the timing of focusing signals from the scanning optical system with the timing of signals from means for indicating lens position.

BRIEF DESCRIPTION OF THE DRAWINGS

The above and other objects and advantages of the invention will become more apparent from the detailed specification in which reference is made to the accompanying drawings (in which like numerals refer to like parts) wherein:

FIG. 3 is a perspective view of the mechanism for indicating the scanner position used in the embodiment illustrated in FIGS. 1 and 2; and FIG. 4 is a group of time versus pulse diagrams which illustrate the nature of the focusing signal at various locations of the circuit.

DETAILED DESCRIPTION OF A PREFERRED EMBODIMENT

Figure 1:
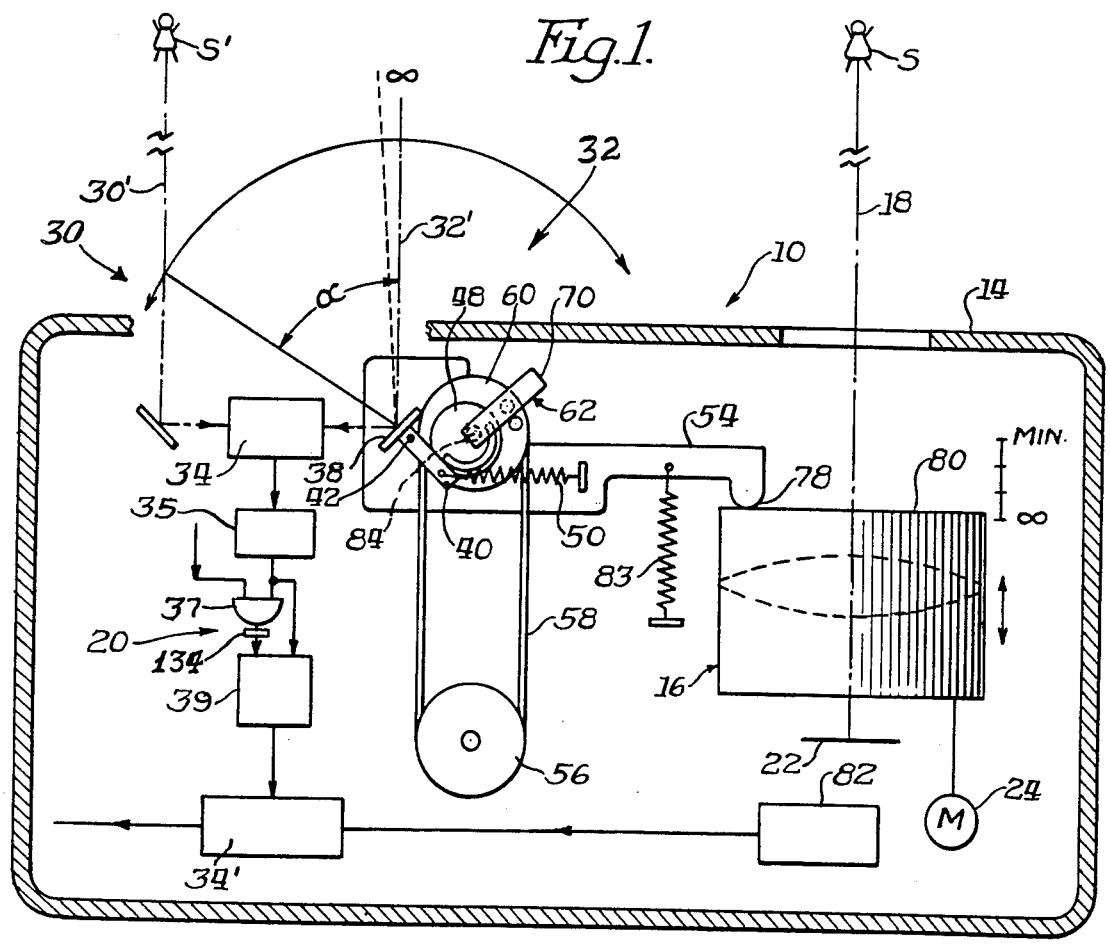
FIGS. 1 and 2 schematically show a camera having an automatic focusing system for adjusting an objective lens according to the present invention.

Referring to FIG. 1, an optical instrument such as a camera 10 is shown having a housing 14 which substantially encloses a focusable objective lens 16 having an optical axis 18 and an automatic focusing system 20. Objective lens 16 or a focusing member thereof is adjustable axially along optical axis 18 for focusing the image of a remote subject S onto an image plane 22 within the camera housing. Automatic focusing system 20 is coupled electrically to a drive motor 24 which mechanically positions objective lens 16 for focusing at a remote distance determined by focusing system 20.

While such systems are well known to the art, briefly, automatic focusing system 20 includes stationary and scanning optical systems 30 and 32 respectively, each of which forms images on a detector 34 such as a Honeywell Visitronics module. Axis 30' is oriented parallel to axis 18 and forms a reference image of the subject S on an array of photoresponsive elements in detector 34. Scanning system 32 is spaced from the optical system 30 and includes a sensor or scanner shown as a mirror 38 which, by moving through an angle α sweeps its axis 32' through an angle α relative to detector 34. As mirror 38 sweeps the field, the image of optical system 32 varies with respect to the image of optical system 30. These images are directed to the light sensitive arrays of detector 34, which generates a focusing or peak signal when each image impinges on its respective detector array in a like manner.

Through circuitry of automatic focusing system 20, motor 24 is selectively energized to adjust the focusing member of objective lens 16 toward or from image plane 22. This movement enables the camera to focus the image of a subject S at the image plane 22 when subject S is located at any distance between infinity (a maximum focus condition) and a minimum focus condition for lens 16.

Figure 2:
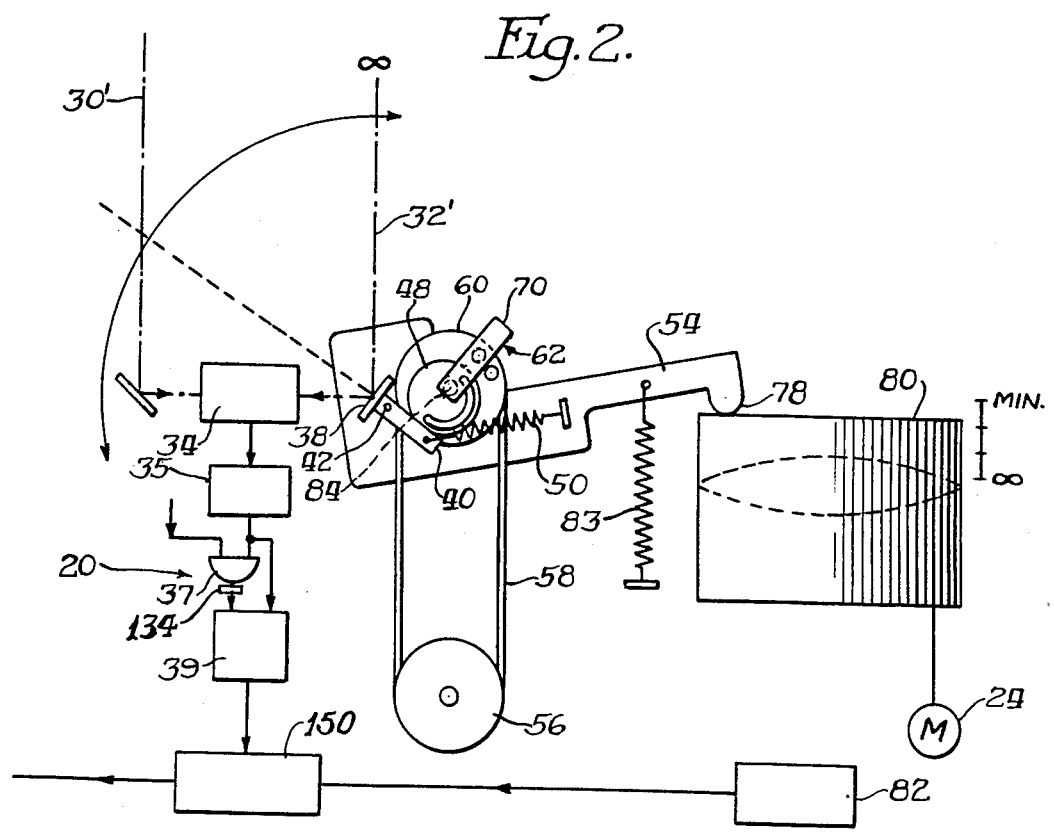

Referring to FIG. 2, mirror 38 is supported by a scanner holder 40 which is pivotally mounted about an axis 42. Scanner holder 40 is biased toward and engages an eccentric cam 48 by a spring member 50 which is attached to a base lever member 54. Hence, holder 40 oscillates due to the rotation of cam 48, which is driven by a pulley 56 powered by a belt 58 and a pulley 60 to which cam 48 is fastened or on which it is formed integrally. Cam 48 is located eccentrically with respect to the pulley 60 axis to cause mirror 38 to sweep through an angle α during each revolution of pulley 60. This scanning angle may be varied over the field of view and range of focus of objective lens 16. Thus, scanning system 32 will detect any subject within the range of focus so that its distance can be determined (by a focusing signal representing such distance), even if the subject is at either of the extreme opposite ends of the scanner field of view. According to one feature of the invention, the bisector of the scanned field will be aligned on subject when automatic focus system 20 focuses lens 16 thereon and, by means described below, the focus setting of lens 16 is fed back to mirror 38.

Referring to FIG. 3, means are provided to correlate the position of mirror 38 to an object distance. Illustratively, pulley 60 is provided with a position indicator system 62 which includes a signal generator shown as a hole 64 formed in the pulley 60 for controlling the passage of light rays from an auxiliary light source 66 to a light sensor 68. Light source 66 and sensor 68 are aligned relative to one another and fixed to a frame 70 which supports a shaft 72 about which pulley 60 is rotated. Mirror holder 40, the pulley 60, and the bracket 70 are installed on movable base lever member 54 which is rotatably mounted coaxially with the axis about which the scanner support 40 moves.

The position of the base lever member 54 (and the components supported thereon) is related to the position of lens 16 by a contact tip portion 78 (FIG. 1) of base lever 54, biased into engagement with a rim 80 of lens 16 by a spring 83 fixed to camera housing 14. Axial adjustment of lens 16 for focusing the image of a remote subject S at image plane 22 causes a corresponding adjustment of rim 80 and movement of contact tip portion 78. Base lever 54 therefore rotates about its axis 84, thereby rotationally displacing the angular field scanned by mirror 38, i.e. rotationally shifting the end positions of scan by equal angles. Particularly, tip portion 78, base lever member 54, scan mirror 38 and lens 16 are relatively configured so that when objective lens 16 is focused on a subject, mirror 38 is in the middle of its scanning arc. For example, when objective lens 16 is focused on a subject a distance of five meters from the camera, the field scanned by the mirror 38 sweeps through an angle of α (alpha) degrees in front of and α degrees behind a line joining and the middle of a mirror 38.

In FIG. 2, base lever member 54 is shown rotated about axis 84 in a counterclockwise direction from its orientation in FIG. 1. Lens 18 is focused illustratively near a minimum object distance condition. Mirror 38 sweeps cyclically from two end positions located at α degrees before and α degrees behind a line joining a subject at such minimum focus position and the middle of mirror 38, i.e. bisector of the total angle scanned is on subject at the focus condition.

In FIG. 3, the base lever member 54 supports the bracket 70 carrying opposing light source 66 and optical sensor 68, with the pulley 60 therebetween. Bracket 70 is movable about the axis 72 of the pulley. Once during each rotation of pulley 60, hole 64 permits light from light source 66 to impinge on sensor 68. Hole 64 can be adjusted with respect to cam 48 so that each signal from sensor 68 occurs when mirror 38 scans the position corresponding to the object distance setting of objective lens 16. Correction of the relative positions of the components may be made by a factory or service center adjustment of the position of the bracket 70 about its axis. It will be understood that since hole 64 and cam 48 are fixed to the pulley 60, the orientation of mirror 38 is related to the signal from sensor 68.

Further shown in FIG. 3, cam 48 carries an electrically conductive contact 49 (insulated from the system) which cooperates with a sliding contact 51 connected to bracket 70. A direct current voltage is carried across contacts 49 and 51 when they close. The direct current voltage may be supplied to the contacts 49 and 51 from a source such as a battery (not shown) via shaft 72 which is electrically insulated from bracket 70 which supports contact 51. Contact 49 is shaped and positioned to carry current during only a portion of each revolution of cam 48. Illustratively, contact 49 is in the shape of a 180 degree arc, and thereby carries current during half of each revolution of cam 48. It will be appreciated that the electrical signal provided via contacts 49 and 51 is related to the position of mirror 38 and lens 16.

FIG. 4A represents the relative position of mirror 38 during one cycle of scanning, in which mirror 38 moves from one end position 100 along a forward scan 102 to the other end position 104, and then back along a return scan 106 to the first end position 100. During the forward scan 102, mirror 38 at some time scans the subject to be photographed S' and forms its image on the arrays of detector 34 which emits a peak pulse or focusing signal 110 shown in FIG. 4B. A second pulse 112 is emitted by detector 34 during return scan 106 when mirror 38 again scans subject S'. The spacing between pulses 110 and 112 is a function of the distance from camera 10 to the subject S' since the spacing is directly related to the angular positions of mirror 38 at which the subject S' is sensed. The dotted pulses 114 and 116 in FIG. 4B represent a delayed signal which may characteristically result from, for example, a low light level or high scanning speed. The spacing between pulses 114 and 116 is identical to that between pulses 110 and 112 because the subject distance is a function of pulse spacing. Pulses 110 and 112 (or 114 and 116, as the case may be) are modified by a peak sharpening electronic circuit 35 which outputs pulses 118 and 120 for pulses 110 and 112, respectively (or 122 and 124 for pulses 114 and 116, respectively). As shown in FIG. 4C, the spacing between pulse 118 and pulse 120 is equal to the spacing between pulses 122 and 124. Further, during forward scan 102, contacts 49 and 51 output a signal 130 shown in FIG. 4D. These signals, together with signals indicating the position of lens 16, are used to focus lens 16. It will be appreciated that when lens 16 is focused on subject, the pulses of FIG. 4C will be separated in time by T/2. Comparison of the actual separation and timing relative to such signals as those of FIG. 4D can be used to focus lens 16.

Illustratively, the output of circuit 35 is applied to one input of an AND gate 37 and to the Reset input of an RS type flip-flop 39. Signals 130 generated by contacts 49 and 51 are coupled to the other input of AND gate 37. Thus AND gate 37 receives the signals illustrated in FIGS. 4C and 4D and outputs a signal 132 shown in FIG. 4E. The output of AND gate 37 is delayed slightly by a suitable delay circuit 134 whose output 136 (FIG. 4F) slightly lags pulse 118. The output of delay circuit 134 is coupled to the Set input of flip-flop 39. Thus, flip-flop 39 is set by pulses 136 of FIG. 4F and is reset by pulses 120 of FIG. 4C and outputs signals 140 shown in FIG. 4G. The timing of those signals are a measure of the position of scanning system 32. FIG. 4H shows the output 142 of flip-flop 39 when pulses 122 and 124 are emitted by detector 34 due to low light or high speed scan.

A comparison circuit 150 receives signals 140 and signals from either sensor 82 or system 62. Sensor 82 can be any type of signaling device to indicate the position of lens 16. Sensor 82 may take a variety of forms, such as a bridge circuit variable resistance mechanically coupled to lens 16 or rim 80, or may be a circuit coupled to contacts 49 or 51 whose timing is controlled in part by mechanically coupling to rim 80 via tip portion 78.

Alternatively, the light sensor arrangement 62 shown in FIG. 3 may be used so that the output of sensor 68 is a measure of lens 16 position (System 62 need not otherwise be included in the camera system). The timing of signals 140 is compared with the timing of the lens 16 position signal from sensor 82 to determine if signal 140 is generated before or after the lens position signal and to determine further the difference in lens position from the correct focus position. Preferably, a comparison between two DC voltages is made, thus giving the amount and direction of correction necessary. In response to the position error detected, the drive motor 24 for adjusting focus of the objective lens is energized in a direction as required until the signals coincide. Such signal coincidence (DC voltages) indicates to the focusing system that the object distance setting of the objective lens 16 corresponds to the orientation of the optical axis 32' of the moving scanner when the sensing circuit 34 detects maximum image correspondence. More specific details of comparison circuits are well known to those skilled in the art and are not, therefore, set forth herein. For such details, the reader is referred to U.S. Pat. Nos. 4,059,756; 4,059,757; 4,085,320; and 4,091,275 to Wilwerding, for example.

In summary, the mechanism described for improving the accuracy of automatic focusing systems for use in adjusting the focus of the objective lens of a camera is based on comparing the images from two optical systems, one of which is scanned across the scene to be photographed. The scanner is mounted on a movable base member for movement responsive to the focus condition of the objective lens so as to alter the scanning aspect of the scanner. When the scanner sweeps across the middle of its scanning track, the scanner faces the position corresponding to the object distance. Orientation of the scanner is translated to the focusing system by a lens position signal which is generated by a position indicator device.

The embodiment illustrated uses a method which measures the time interval between two focusing signals in a full cycle mirror scan (forward and return). By doing so, any time delay caused by a low light level or high scanning speed will equally affect both focusing signals so that the time interval between the two signals will not change. No compensation is required for scene brightness as a result of this "closed loop system".

I claim:

1. For an optical instrument having a focusable objective lens, and an automatic focusing system including a scanner optical system having a scanner means and a reference optical system wherein images of a remote subject are caused respectively to impinge on a detector means, the detector means generating an output signal representing the object distance of the subject when the images on the detector are coincident, the elapsed time between a pair of detector output signals being a function of the distance between the instrument and the subject, and including means to adjust the focus of the objective lens to the object distance, the improvement in a means to compare and relate the orientation of said scanner system and the focus condition of the objective lens comprising:

reference means on said objective lens adjustable in response to variations in focus condition of said lens and for signalling the position of said lens, scanner drive means for driving said scanner means about an axis oscillatably through a predetermined angle, means supporting the scanner means for arcuate movement of the axis thereof, means on said scanner supporting means for engagement with said objective lens focus condition reference means for arcuate positioning of said supporting means, electronic circuit means connected to said detector means and said reference means to convert the timing of said output signals therefrom to a voltage of amounts relative to the position of the subject and the position bisector of said scanner oscillation, said electronic circuit including an AND circuit for comparing the timing of said detector signals with a signal from said scanner equal to the time of one oscillation to emit a control signal equal to the difference therebetween, and control means connected to receive the sum of said timing signal and said lens position signal for automatically focusing said lens.

* * * * *